United States Patent Office 3,414,455
Patented Dec. 3, 1968

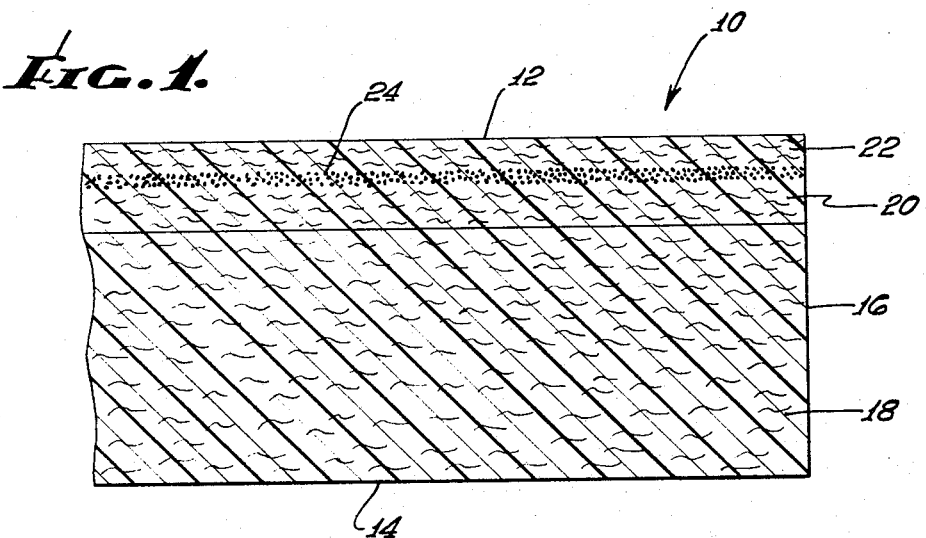
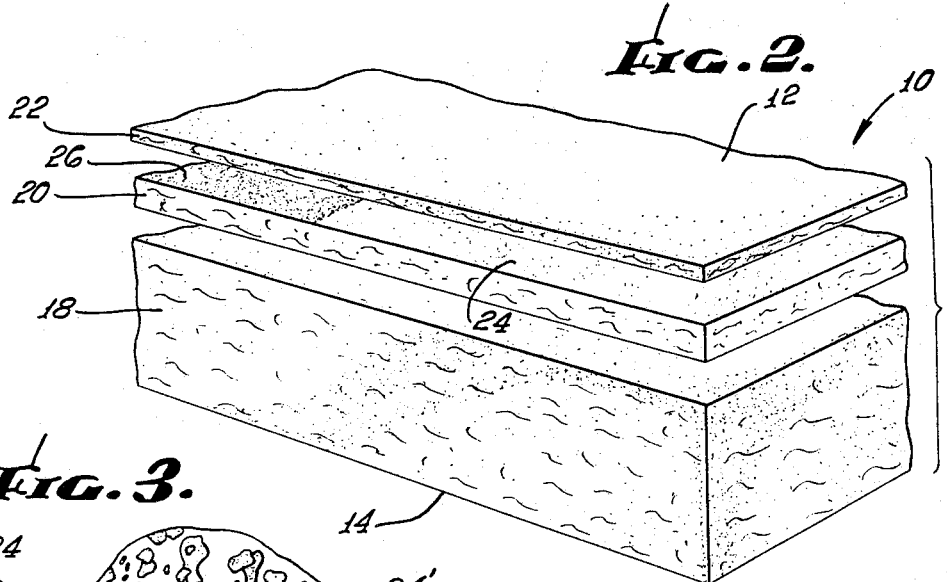
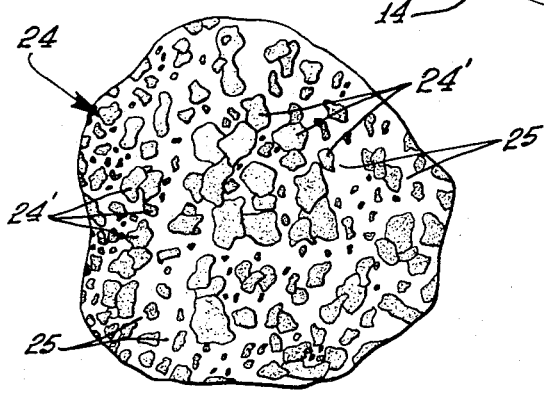
INVENTOR.
JOSEPH W. ROBBINS
EDGAR F. TWOMEY, JR.
By Beehler & Grant
ATTORNEYS.

3,414,455
RADIANT ENERGY REFLECTIVE AND TRANSLUCENT STRUCTURES OF FIBER-REINFORCED PLASTICS
Edgar F. Twomey, Jr., Glendale, Calif., and Joseph W. Robbins, Grants Pass, Oreg., assignors to E. F. Twomey Co., Inc., Los Angeles, Calif., a corporation of California
Continuation-in-part of application Ser. No. 458,803, Apr. 12, 1965. This application Sept. 12, 1967, Ser. No. 684,079
7 Claims. (Cl. 161—5)

ABSTRACT OF THE DISCLOSURE

A multiple ply structure is bonded into a homogeneous panel structure by a synthetic plastic resin. A relatively thick layer of chopped strand glass fibers has applied to it on one side a sheet of paper of open porous construction and on the side of the sheet of paper facing away from the relatively thick layer is a deposit of aluminum flakes scattered over the surface in spaced relationship so that a desired amount of light will pass between the flakes. The flakes are applied so that most of them lie flat on the sheet of paper, and all three layers are bonded together with an impregnation of synthetic plastic resin which penetrates the spaces between the metal flakes, the fibers of the paper and the glass fibers, there being just enough resin to form a very thin film over the metal flakes so that, when the structure is placed with the metal flake side facing the sun, the sun rays which are to be reflected need pass through only a very thin layer of plastic before being reflected back through the same thin layer and thereby avoid heating up the structure.

---

This application is a continuation-in-part of Ser. No. 458,803, filed Apr. 12, 1965, which in turn is a continuation application of Ser. No. 61,561, filed Oct. 10, 1960, each application is abandoned.

Structures or panels of this invention may be of sheet form to serve as panels for room partitions, decorative screens and canopies for patios, for example. When panels of this invention are employed to form an overhanging shelter or other roof structure, they reflect much of the sun's heat and yet are of sufficiently open construction to allow the area which is covered to be illuminated through the panel. Also, structures of this invention may be other than of flat form, i.e., they may be molded to an arcuate shell form.

The invention makes it possible to manufacture thin wall structures of predetermined light transmitting capability and reflectance. As disclosed therein, the parameters of control for obtaining desired degrees of transmission and reflectance are increased. Not only is the amount of metal in the structure subject to control, but so also is control of the concentration or density of the metal deposit and its proximity to the chosen surface of the structure. When, for example, a given amount of metal particles is dispersed homogeneously throughout the mass of plastics material in a panel, it will provide substantially less reflectance than when disposed in a predetermined stratum, as taught by this invention. In the case of homogeneous dispersion, in order to achieve the same degree of reflectance as that of a panel of this invention, a prohibitively greater amount of metal particles would be required, so much as that the panel would be practically metallic mass.

Another feature of the invention resides in providing a thin wall structure of the above mentioned character which may have a colored design, preferably of a negligible density such that the area of the metal deposit, which is coextensive with the colored design, is faced with the color of the design.

The foregoing and further advantages of the invention will become apparent in the specification wherein the details of construction of a selected embodiment and a method for forming the same are described with reference to the accompanying drawings, in which:

FIGURE 1 is a cross-section, greatly magnified, through a marginal portion of a panel of this invention;

FIGURE 2 is an exploded view of corner portions of sheets, in perspective and magnified to a lesser extent than is the panel of FIGURE 1, the sheets being arranged in superimposed relationship prior to being united with plastic as taught by this invention; and FIGURE 3 is a plan view of a metal flake coating, greatly magnified.

Referring to the drawing in greater detail, the invention is illustrated as the same may be embodied in panel form, the panel of FIGURE 1 being designated generally by the reference numeral 10. One surface of the panel, herein referred to as a top surface or weather surface, is designated by numeral 12, and the opposite bottom surface or protected surface is designated by numeral 14. The panel portion of FIGURE 1, being a marginal portion of the panel, has a peripheral or edge surface 16.

When panels of this invention are made for use in canopies and partitions, the various commercial grades thereof may range from about 45 thousandths to about 100 thousandths of an inch in thickness, i.e., dimensions between surfaces 12 and 14. The larger the area to be spanned by a panel, the greater its thickness should be. Also, in installations where the panel is subject to pressure, it should be of the thicker grades.

Panel 10 is formed of three superimposed sheets or layers of material, each sheet being coextensive in area with the panel. The three sheets are shown in FIGURE 2, as consisting of a relatively thick base layer or sheet 18, and a relatively thin intermediate layer or sheet 20, and a relatively thin top layer or sheet 22. Although the sheets 18, 20 and 22 may be of woven strands of fibers, for the panel 10 as shown they are of matted fibers.

The base layer or sheet 18, for the illustrated embodiment, is a matting of chopped strand glass fibers of commercially coarse grade. For a panel of about 0.050 inch thick a base sheet 18 of initial thickness of about 0.050 inch thick may be employed, the fibers of the sheet being subsequently compacted in the finished panel, as will be explained hereinafter. By way of example of a commercially available glass fiber sheet for base sheet 18, it may be from about 1.1/2 to 3 ounces per square foot.

It is the intermediate layer or sheet 20 of the panel 10 which serves as a carrier for an expanse of metal embedded in the panel. Such metal expanse has been designated by reference numeral 24 and comprises a thin deposit of metal particles 24′, e.g., brass, bronze, copper, and aluminum, depending upon the color desired. For panel 10, the metal deposit 24 is of flake aluminum particles. Such aluminum particles are deposited on one surface of the intermediate sheet 20, here the top surface of the intermediate sheet. There are numerous spaces 25 between the particles through which sunlight can pass, and the concentration of particles is controlled in accordance with how great a percentage of sunlight it is desirable to have pass through the panel. Though it is practical within the broad concept of the invention to employ a metal carrier sheet of finely woven strands of fibers, it is preferred that the carrier sheet be of matted fiber construction as in the illustrated embodiment so as to provide a uniform fiber space density to obtain a metal deposit of uniform density throughout the area of the panel. Also in the finished panel, the intermediate sheet 20 is practically invisible, the intermediate sheet being thoroughly saturated or impregnated by the plastic mass of the panel as will be described hereinafter.

For a panel of about 0.05 inch thick, an intermediate sheet 20 of about 0.005 inch thick will serve satisfactorily as a carrier for the metal deposit and for becoming practically invisible in the finished panel. A paper of high absorbency is preferred for use as the intermediate sheet inasmuch as paper provides a smooth flat surface for the metal deposit whereby the metal deposit will be smooth and evenly textured. A preferred paper of about 0.005 inch thick is one of alpha cellulose having a weight basis for 500 sheets (24 inches x 36 inches) of 29 pounds. The absorbancy of such alpha cellulose paper, as measured by the Klemm test is in the neighborhood of M.D. 28/46 inch per two minutes. Bleached alpha cellulose, saturating type paper having this weight and absorbency is available commercially as No. 812 paper, and also as No. 529 paper. Although alpha cellulose paper is preferred, an acceptable material for the layer on which the metal is deposited may be rayon cellulose, namely a paper predominantly of regenerated cellulose or rayon fiber in mixture with a secondary fiber normally alpha cellulose. The chief attribute of the material on which the metal is deposited is that it be initially porous, relatively thin, a good carrier for the metal particles and strong enough to hold its form.

Prior to impregnating the intermediate sheet with plastic to form the finished panel, as will be explained hereinafter, the aluminum or other particles are deposited upon a surface of the intermediate sheet. Such deposition of particles on the sheet may be suitably accomplished in any of several different ways, e.g., rotogravure printing, flexographic printing, screen process printing, dip coating, roll coating, knife coating, and deposition by a vacuum metalizing method wherein the metal, e.g., aluminum, is vaporized in a vacuum chamber and deposited on the carrier sheet. When the metal is in the form of flakes, it is best to have the flat metal surfaces parallel to the sheet of paper. It is particularly important to have the metal particles scattered to provide spaces between them through which a portion of light falling on the panel may pass. By varying the distribution, brilliance and, to a degree, the quantity and shape of the metal particles, different percentages of control can be achieved. For example, to provide for passage of about 40 percent to 60 percent of heat and reflection inversely of about 60 percent to 40 percent sunlight, aluminum flakes are deposited on the paper to an amount from .2 to 2.0 grams per square foot of area covered. It should be understood that the size of the flake particles, the reflective ability and distribution make the weight factor a variable one. Different metals may require slightly different proportions. When the overlying resin saturated glass fiber film is used of thickness from 3 to 10 mils, good results can be expected.

In the case of the vacuum metalizing method of aluminum deposition, the carrier sheet may be properly smoothed to produce a brilliant coating of vaporized aluminum particles with no bonding agent necessary to hold the aluminum on the paper.

For the several mentioned printing and coating methods, the aluminum particles are applied to the alpha cellulose sheet in the form of an ink for bonding the aluminum particles to fibers of the sheet.

A suitable aluminum ink comprises a resin vehicle in which the aluminum particles are dispersed and which upon hardening serves to adhere the aluminum particles to the paper sheet. Since only the metal particles receive the ink coating, the panel will provide the same percentage of light transmission as a panel which is not colored. Particular synthetic resins, which we have found to be especially well suited for use as the resin vehicle for aluminum ink, are the commercially available vinyl butyral resins. We understand that the vinyl butyral resins are partial butyrals of polyvinyl alcohol having some unreacted polyvinyl alcohol groups therein. Other examples of suitable resins for this purpose are:

(1) Polymers of esters of acrylic and methacrylic acids, especially the "Acryloid" resins and the "Lucite" resins;

(2) Cellulose acetate butyrate polymer having an acetyl content of about 13 percent and a butyryl content of about 37 percent and an average molecular weight of 30,000;

(3) Cellulose nitrate resins; and (4) Soluble resin copolymers of polyvinyl acetate.

The vehicle portion of the aluminum ink further includes a volatile solvent for the resin. The suitability of a particular volatile solvent for this purpose is determined by its compatibility with the end printing method to be employed, as is well understood by those skilled in the printing art. For the specific example mentioned above of "Bakelite" vinyl butyral resins, and in particular one containing 80.7 percent vinyl butyral resin, 19.0 percent vinyl alcohol resin and 0.3 percent vinyl acetate resin, serving as the nonvolatile portion of the ink vehicle, commercial aldehydes such as pyruvic aldehyde (methyl glyoxal) or glyoxal which are available in aqueous solutions, generally containing approximately 70 percent by weight of water and 30 percent by weight of aldehyde are suitable for use as cross-linking agents for such butyral resins. For printing by the roll coating method the specific vinyl butyral resin mentioned above by way of example may be dissolved in the aldehyde and volatile solvent to a concentration of about 12 percent of resin by weight. In this case the vinyl resins become further reacted with the aldehyde to complete the molecular linkages in the resins because of the presence of free hydroxyl groups in the basic vinyl molecule, whereby the unreacted aldehyde constitutes no more than 10 percent of the weight of the combined vinyl resins present. The resulting resin and solvent solution containing the combined vinyl resins and aldehyde and water in the aforementioned portions is neutral and nonreactive, is completely compatible with the standard polyester, acrylic and other suitable resins for the plastic panel, and with the glass reinforcing fibers of the preferred types of base sheets for reinforcing the panel. Furthermore, such resin and solvent solution is nonreactive with the standard catalysts and promoters used to polymerize the standard polyester resins and other commercially available molding resins. Also such resin and solvent solution introduces no weak bridges in the structural strength of the standard polyester resins and glass fiber reinforcement.

For rotogravure and flexographic printing the volatile solvent of the ink vehicle is, preferably, denatured methyl alcohol. For screen process printing, diacetone alcohol may be advantageously used as the volatile solvent of the ink vehicle.

For a suitable aluminum ink, the resin-solvent solution is pigmented with aluminum particles, such as No. 242 Extra Brilliant Aluminum Powder, to the extent that the aluminum weight is from about 3% to about 15% of the resin-solvent solution. The particle size for such aluminum particles is from about 10 microns to about 150 microns in diameter. The amount of aluminum to be employed depends, in part, on the particle size thereof and the degrees of translucency and reflectance desired.

Whatever method is employed to apply the aluminum powder to the alpha cellulose paper, for commercially acceptable panels, the aluminum deposit should be of sufficient density to achieve a reflectometer reading of at least 50%, 100% being magnesium oxide. A density of that order will provide satisfactory brilliance in the panel and yet the panel will be translucent enough to allow sufficient filtered light to penetrate to the bottom surface 14 from the top surface 12.

Another factor to be controlled in the production of suitable panels according to this invention is that of insuring that the bonded aluminum deposit will be porous enough to allow impregnation of liquid plastic through the aluminum ink deposit during the molding operation of the panel, which will be explained more fully hereinafter.

Panels of this invention are adapted to have a colored design formed therein. For patio roofs, for example, the panels may have a striped design in which colored stripes alternate with uncolored aluminum stripes. In the illustrated embodiment a portion of one such colored area or stripe appears at 26, it being a deposit or printing of a suitable pigment or dye on the upper surface of the intermediate sheet 20 following the deposition of the aluminum particles, the dye being applied to the outwardly facing sides of the metal particles. The amount of pigment or dye used to provide a colored design in the panel is enough, of course, to produce a colored tint which is visible through the finished panel, thin enough to be translucent and to allow the liquid plastic to permeate the dyed sheet when the panel is molded.

Referring now to the particulars of the top sheet 22, for a finished panel of 0.05 inch thickness, a matted sheet of fine glass fibers of a sheet thickness of about 0.005 inch will serve satisfactorily. As such it is of thickness comparable to the thickness of the paper or sheet 20 and thick enough to make sure that the largest of the metal particles are ultimately covered. The thickness of the top sheet 22 may vary from about .002 to about .010, with minor variations in the over-all thickness and the results desired. Such top sheet 22 provides a mass for creating a reinforced plastic stratum in the panel covering the metal deposit 24. But for the veil which is provided by the top sheet 22, the aluminum particles would not be embedded in the finished panel to a sufficient depth to avoid the possibility of particles projecting up to the top surface of the panel. Whether or not fibers be employed over the metal particles, the largest of the particles should be covered by the resin when applied, thereby to determine the preferred depth of the resin deposit.

To mold the panel 10, the three sheets 18, 20, and 22 are stacked with their corresponding edges coincident with each other as is illustrated in FIGURE 2, the intermediate sheet 20 being placed on the base sheet 18, with the aluminum deposit facing upwardly, and the intermediate sheet being then covered by the top sheet 22. With the sheets being arranged in such superimposed relationship, a hardenable liquid plastic composition is poured upon the upper surface of the top sheet 22 and is spread over the full area of the stacked sheets whereby the liquid plastic material will suffuse through the reinforcing and metal carrier sheets. Any suitable clear thermoplastic or thermosetting resin may be employed as the liquid plastics material for the forming of the panels of this invention, a most popular resin for fiber-reinforced plastic coatings and panels being polyester resin or plastics material, which, as is well understood by those skilled in the art of forming fiberglass coatings and articles, is readily available commercially with standard catalysts and promoters for polymerizing or hardening the liquid resin. The plastic hardens as a clear, rigid, unitary mass containing the base, intermediate, and top sheets. As the liquid plastic composition is spread over the sheets, it compacts the sheets. Before the liquid plastic composition has become hardened, a flat weight may be placed upon the upper surface of the hardening panel to provide a smooth glossy surface or bright polish to the upper surface of the panel as well as to the bottom surface 14.

Inasmuch as each of the fiber sheets of the panel are readily permeable by the liquid plastics material, the liquid plastics material may be poured over the upper surface of the base sheet 18 prior to placing the intermediate sheet 20 and the top sheet 22 upon the base sheet, whereby the liquid plastics material will permeate up through the intermediate sheet and the top sheet to provide a smooth upper surface 12 of plastic for the panel. Also, if desired, each sheet may be separately saturated with the liquid plastics material and then placed one upon the other.

Although one of the above described methods for forming the panel 10 includes the initial steps of placing distinct sheets 18, 20, and 22 one directly upon another, the finished panel is not one of a plurality of distinct laminas, but instead is one in which the thermoplastic or thermosetting resins (e.g., acrylics or polyesters) impregnated throughout the several sheets of fiber material and become hardened as a unitary mass extending to and between the surfaces of the panel. This, the finished panel 10 is formed of a plurality of strata, i.e., a base stratum of fiber-reinforced plastics material, which includes the glass fiber sheet 18; a subsurface stratum of fiber-reinforced plastics material, which includes the paper sheet 20; a subsurface stratum of plastics impregnated aluminum particles 24, which includes a bonding resin; and a top stratum of fiber-reinforced plastics material, which includes the glass fiber sheet 22. Also the dye which becomes thoroughly impregnated with the plastics material constitutes another subsurface stratum. The top stratum may on occasions be combined with the subsurface stratum and in this instance the stratum nearest the weather surface will consist of metal particles saturated with resin to a depth sufficient to about cover the largest of the metal particles.

Structures of this invention may, of course, be formed to a desired configuration. The flat form panel illustrated in FIGURE 1 of the drawing is a popular form. Another popular form is the corrugated panel, not illustrated. In the manufacture of contoured or fluted panels, a plurality thereof may be formed one upon the other with spacer sheets of waxed paper, for example, being used between adjacent panels in a stack.

In view of the foregoing, it will be apparent that this invention provides structures of light transmissive and heat reflective properties for decorative and structural panel uses. Room dividers or partitions, fences, patio roofs, ceiling lights in buildings, and commercial outdoor signs are only some of the useful purposes to which panels of this invention may be put. The light transmitting properties of the structures make them perfectly suitable for many types of installation.

Having described the invention, what is claimed as new in support of Letters Patent is:

1. A sheet of relatively stiff fiber reinforced thin wall structure capable of transmitting therethrough a portion of sunlight falling thereon, said structure having a relatively thick first layer on one side having one surface adapted in use to face away from the sun, said first layer comprising matted chopped strand glass fibers of weight from about 1½ to about 3 ounces per square foot, a second layer overlying said first layer on the side thereof opposite said one surface and comprising a relatively thin paper material including fibers in a porous arrangement, said paper material extending over substantially the entire area of said first layer, a third layer comprising a deposit of metal particles on the side of said paper material opposite from said first layer and wherein the metal particles are in spaced relationship and have areas therebetween adapted to allow passage of a portion of sunlight thereon, said deposit of metal particles extending over substantially the entire area of said paper material and said first layer, and a mass of hardened synthetic plastic resin completely saturating and bonding together all of the layers in an integral structure, said resin having a thickness on the side of said paper material opposite said first layer covering said metal particles with a relatively thin film of about the thickness of said paper material, whereby said metal particles are enabled to reflect a substantial portion of sunlight falling thereon before it penetrates the structure.

2. A structure according to claim 1 wherein the thickness of said resin on the outwardly facing side of the layer of paper material is about 1/10 the thickness of the structure.

3. A structure according to claim 1 wherein the metal particles are from 10 to 150 microns in diameter and are separate particles in a discontinuous pattern.

4. A structure according to claim 1 in which said fiber sheet has a translucent design of colored substance on one surface of the metal particles, said colored substance being of uniform density throughout the area of the colored design.

5. A structure according to claim 1 in which there is a relatively thin layer of fibers having spaces therebetween and covering said deposit of metal particles, said relatively thin layer being of thickness comparable to the thickness of said second layer and impregnated with the resin which impregnates the others of said layers, whereby to provide an integrated structure.

6. A structure according to claim 1 in which said fiber sheet is bleached alpha cellulose paper.

7. A structure according to claim 1 in which said synthetic plastic thermosetting resin is a catalyzed polyester plastic.

References Cited

UNITED STATES PATENTS 3,075,429   1/1963   Deddo _____ 161—6

ROBERT F. BURNETT, *Primary Examiner.*

W. J. VAN BALEN, *Assistant Examiner.*